United States Patent
West

(10) Patent No.: US 6,709,500 B1
(45) Date of Patent: Mar. 23, 2004

(54) SYSTEM FOR SEPARATING ENTRAINED LIQUID FROM A GAS STREAM USING A SLOPED VESSEL

(75) Inventor: Hugh M. West, St. Albert (CA)

(73) Assignee: National Tank Company, Houston, TX (US)

( * ) Notice: Subject to any disclaimer, the term of this patent is extended or adjusted under 35 U.S.C. 154(b) by 0 days.

(21) Appl. No.: 10/272,657

(22) Filed: Oct. 17, 2002

Related U.S. Application Data

(63) Continuation-in-part of application No. 10/072,079, filed on Feb. 8, 2002.

(51) Int. Cl.$^7$ .......................... B01D 19/00; B01D 45/12
(52) U.S. Cl. ........................ 96/216; 95/261; 210/512.2; 210/532.1
(58) Field of Search .......................... 96/216, 177, 182, 96/184, 189, 190; 95/261, 271; 210/787–789, 801, 512.1, 512.2, 532.1, 538

(56) References Cited

U.S. PATENT DOCUMENTS

| | | | |
|---|---|---|---|
| 1,836,004 A | | 12/1931 | Becker ........................ 96/228 |
| 2,808,897 A | | 10/1957 | Reinsch et al. ............... 96/314 |
| 3,201,919 A | * | 8/1965 | Long .......................... 95/254 |
| 3,296,774 A | | 1/1967 | Hoogendoorn et al. ......... 55/92 |
| 3,442,495 A | * | 5/1969 | Schreiber ..................... 261/83 |
| 3,452,518 A | * | 7/1969 | Skaug et al. .................. 96/216 |
| 3,498,028 A | | 3/1970 | Trouw ......................... 55/237 |
| 3,548,939 A | * | 12/1970 | Bennett ....................... 166/267 |
| 3,581,467 A | | 6/1971 | Donnelly ....................... 55/89 |
| 3,605,388 A | | 9/1971 | Zuiderweg et al. ........... 55/236 |
| 3,662,521 A | | 5/1972 | Behar et al. .................. 55/237 |
| 3,930,816 A | | 1/1976 | Miczek ........................ 55/238 |
| 3,985,522 A | * | 10/1976 | Kuhlmann .................... 95/261 |
| 4,128,406 A | | 12/1978 | Spevack ....................... 55/237 |
| 4,400,253 A | * | 8/1983 | Prestridge et al. .......... 204/555 |
| 4,417,971 A | * | 11/1983 | Ferrin et al. ................. 204/663 |
| 4,486,203 A | | 12/1984 | Rooker ......................... 55/174 |
| 4,804,453 A | | 2/1989 | Sublette et al. ............. 204/302 |
| 4,838,906 A | | 6/1989 | Kiselev ........................ 55/238 |
| 4,880,451 A | | 11/1989 | Konijn ......................... 55/237 |
| 5,145,612 A | | 9/1992 | Reay et al. ................. 261/79.2 |
| 5,575,896 A | | 11/1996 | Sams et al. .................. 204/564 |
| 5,644,802 A | * | 7/1997 | Olin ............................. 4/431 |
| 5,683,629 A | | 11/1997 | Konijn ....................... 261/79.2 |
| 5,714,068 A | | 2/1998 | Brown ........................ 210/519 |
| 6,514,322 B2 | * | 2/2003 | West ............................ 95/269 |
| 6,576,029 B2 | * | 6/2003 | West ............................ 55/349 |

* cited by examiner

Primary Examiner—Richard L. Chiesa
(74) Attorney, Agent, or Firm—Gable & Gotwals; Paul H. Johnson

(57) ABSTRACT

A system for separating a mixed phase stream into gas and liquid includes an elongated sloped vessel having a vortex tube cluster therein through which the mixed phase process stream is introduced and by which liquid is extracted from the gas, the vessel having a gas outlet adjacent an upper end of the sloped vessel, a liquid outlet adjacent a lower end of the slope vessel and a weir within the vessel establishing a liquid level above which gas accumulates, the cross-sectional area within the vessel above the liquid level increasing in the direction towards the gas outlet, and the cross-sectional area within the vessel below the liquid level increasing in the direction towards the liquid (oil and water) outlets.

12 Claims, 6 Drawing Sheets

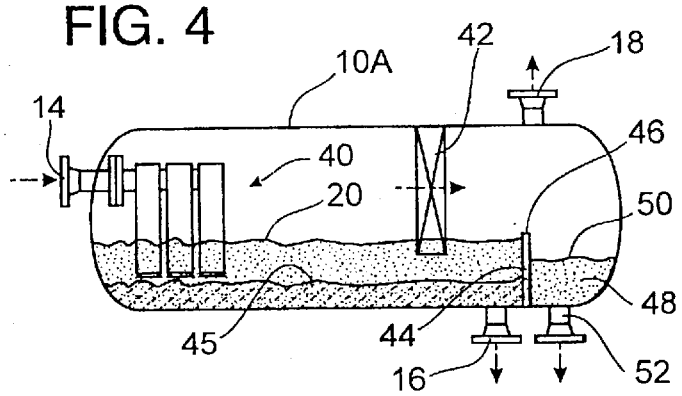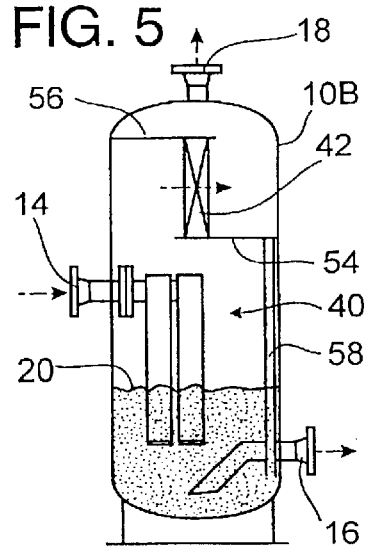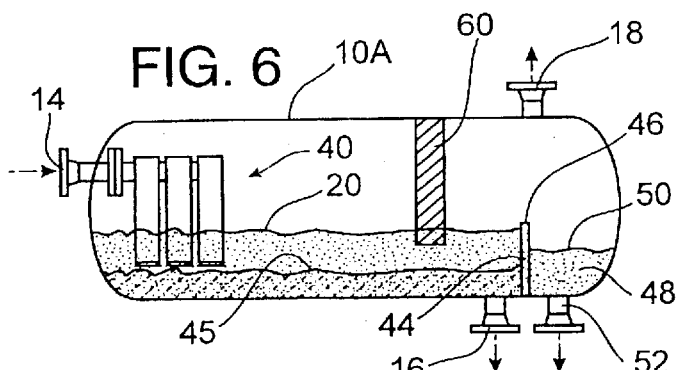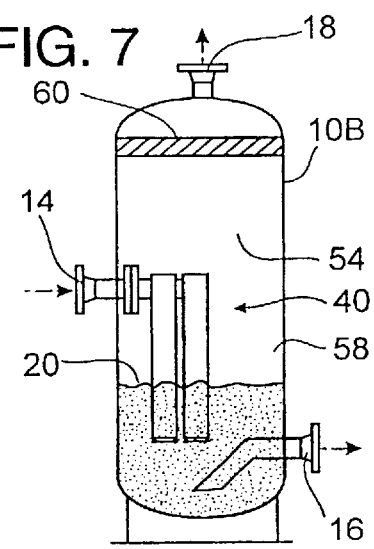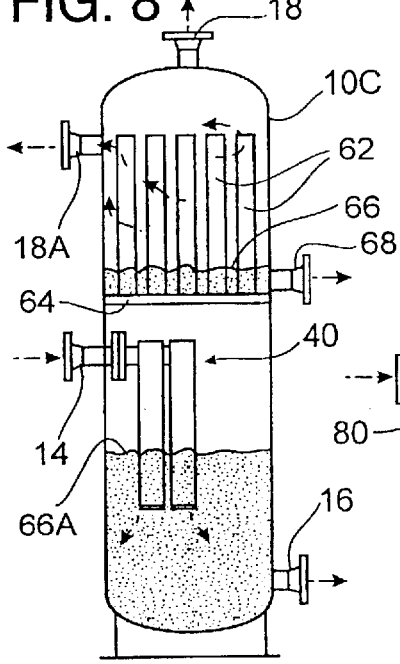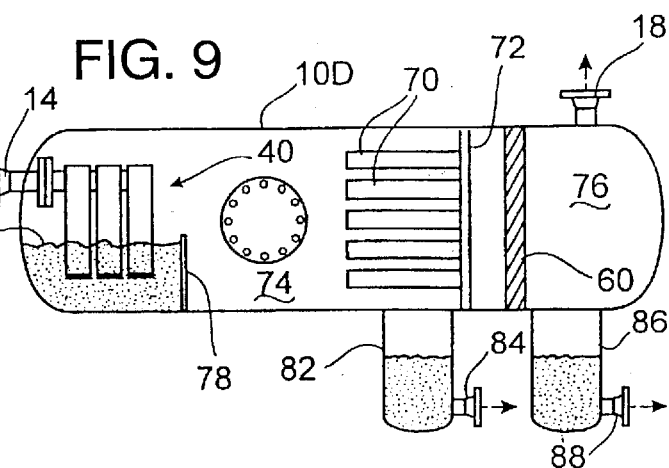

SYSTEM FOR SEPARATING ENTRAINED LIQUID FROM A GAS STREAM USING A SLOPED VESSEL

CROSS REFERENCE TO PENDING APPLICATIONS

This is a continuation-in-part of U.S. patent application Ser. No. 10/072,079 entitled A SYSTEM AND METHOD OF SEPARATING ENTRAINED IMMISCIBLE LIQUID COMPONENT OF AN INLET STREAM filed Feb. 8, 2002.

REFERENCE TO MICROFICHE APPENDIX

This application is not referenced in any microfiche appendix.

BACKGROUND OF THE INVENTION

This disclosure is to a system and a method for separating components from a mixed phase inlet stream.

The invention generally relates to a type of gas/oil/water separator. Separators of this type are typically process vessels that may operate at atmospheric or above atmospheric pressure. The main function of the separator system is to segregate immiscible phases of an inlet stream. The inlet stream may be in the form of gas that carries with it immiscible liquid components, frequently referred to as a "wet gas" stream or may more likely be a mixed phase stream of oil, water and gas. The function of the separator of this invention is to separate out the gas and separate liquid components from a mixed phase inlet stream.

The systems and method of this disclosure are basically applicable to: (1) removing liquid dispersed in a gas stream, such as in which the liquid is of relatively little volume compared to the gas; and (2) removing gas from a liquid stream in which the gas is of a relatively small proportion (by volume) of the stream. In the first instance, the separation process is generally referred to as "gas demisting" and in the second instance, the separation process is generally referred to as "liquid degassing". The liquid component of a mixed phase inlet usually is made up of immiscibly mixed oil and water that are separated and separately withdrawn.

Separators for separating components from a mixed phase inlet stream are commonly utilized in the oil and gas industry, specifically in oil and gas production, oil refining and gas processing, and are also used in the mining industry, chemical plants, water treatment facilities, pulp and paper plants and pharmaceutical manufacturing facilities.

Separation of immiscible components of a mixed phase inlet stream usually depends on the force of gravity. Gravity can be either natural gravity—that is, the pull of mass towards the center of the earth or created (artificial) gravitational forces such as are generated by centrifugal separators. Natural gravity is usually used by flowing a stream having immiscible components into a vessel which provides a quiescent zone -that is, a relatively undisturbed environment that allows gravity to act on heavier components of the stream and move them into a downward part of the vessel. This movement has the counteraction of the lighter components of the stream migrating to an upward part of the vessel. In this way, the heavier components—that is, liquids, can be withdrawn from the lower part of the vessel and the lighter components—that is, gases, withdrawn from an upper part of the vessel. In the petroleum industry, the liquid component in a mixed phase stream is typically oil and water that are separately withdrawn.

Separators commonly have an inlet momentum absorber or deflector to reduce the momentum of the incoming stream and to distribute liquid and gas within the separator vessel. This kinetic energy reduction initiates phase separation inside a separator vessel.

Artificial gravity can be generated by the use of a vortex tube or tubes. A vortex tube is typically an elongated tube having a cylindrical interior wall that is preferably vertically mounted or at least mounted with a vertically downward tangent. The vortex tube (or each vortex tube if more than one is employed) has an inlet arranged so that mixed phase inlet stream flowing therein tangentially intersects the interior wall of the vortex tube and flows around the interior wall to thereby create centrifugal force serving to move the heavier component—that is, liquid components, towards the wall of the vortex tube while the lighter component (gas) is forced towards the interior of the tube. In a typical vortex tube, the gas is withdrawn from an upper central vortex opening while the liquid components are withdrawn from a liquid outlet in the bottom portion of the tube.

This invention herein is a system and method employing a separator apparatus in combination with a vortex tube or a vortex tube cluster. In a vortex tube cluster, each tube receives a portion of the incoming flow stream, which enters tangentially, creating rotational flow. More particularly, this application is a system for separating oil, water and gas from an inlet stream using a sloped vessel of the type that takes full advantage of a vortex tube inlet system to more effectively and efficiently remove the liquid component from an inlet stream and for separating the liquid component into heavier and lighter portions such as to separate oil and water from a crude oil emulsion inlet and for separately discharging the gas and separate liquid components.

For additional background information relating to the general subject matter of this disclosure reference may be had to the following previously issued United States patents:

| U.S. Pat. No. | Inventor(s) | Title |
| --- | --- | --- |
| 1,836,004 | Becker | Apparatus for Treating Gas |
| 2,808,897 | Reinsch et al | Apparatus for Contacting Liquid and Vaporous Materials |
| 3,296,774 | Hoogendoorn et al | Gas-Liquid Contactor with Wall Obstructions and Contacting Method |
| 3,498,028 | Trouw | Apparatus for Contacting Liquids and Gases |
| 3,581,467 | Donnelly | Method and Apparatus for Vortical Liquid-Gas Movement |
| 3,605,388 | Zuiderweg et al | Apparatus for Contacting Liquids and Gases |
| 3,662,521 | Behar et al | Device for Reaction Between Liquid Phase and Gaseous Phase |
| 3,930,816 | Miczek | Structure for a Gas and Liquid Contacting Chamber in a Gas Effluent Processing System |
| 4,128,406 | Spevack | Contact Apparatus for Multiphase Processing |
| 4,486,203 | Rooker | Inlet Momentum Absorber for Fluid Separation |
| 4,804,453 | Sublette et al | Resolution of Emulsions with Multiple Electric Fields |
| 4,838,906 | Kiselev | Contact-and-Separating Element |
| 4,880,451 | Konijn | Gas/Liquid Contacting Apparatus |
| 5,145,612 | Reay et al | Apparatus for Mixing Vapor in a Countercurrent Column |
| 5,575,896 | Sams, et al | Method and Apparatus for Oil/Water Separation Using a Dual Electrode Centrifugal Coalescer |
| 5,683,629 | Konijn | Horizontal Tray and Column for Contacting Gas and Liquid |
| 5,714,068 | Brown | Inlet Device for Large Oil Field Separator |

A better understanding of the invention will be obtained from the following description and claims, taken in conjunction with the attached drawings.

BRIEF SUMMARY OF THE INVENTION

The invention herein relates to a method, and a system for practicing the method, of separating gas and entrained immiscible liquid components from a mixed-phase inlet stream. The method includes the steps of introducing a mixed-phase stream (that may hereinafter be referred to as an "inlet stream") into the inlet of a treatment vessel, the vessel having a dry gas outlet, an oil outlet and a water outlet. The inlet stream is passed into at least one vortex tube but in the preferred practice of the invention, into a cluster of vortex tubes. Whether one or a plurality of vortex tubes, the inlet stream passes into one or more vortex inlets wherein the stream is caused to circumferentially swirl within cylindrical walls of the vortex tubes—that is, the inlet stream rapidly rotates. This rapid rotation causes the liquid components and any entrained solids, to be moved to the circumference of the rotating stream. A gas opening is provided centrally within an upper portion of each vortex tube and a liquids/solids outlet in a lower end of each vortex tube.

Particularly, the invention herein provides a system for separating gas, oil and water from an inlet stream including an elongated sloped vessel having a vortex tube cluster therein through which the inlet stream is introduced and by which gas is extracted. The vessel includes a gas outlet adjacent an upper end of the sloped vessel with oil and water outlets adjacent the lower end.

A weir within the vessel establishes a liquid level above which gas accumulates. The volumetric area within the sloped vessel above the liquid level increases in the direction towards the gas outlet. This increased volumetric area reduces the velocity of gas flow towards the exit and provides a quiescent gas zone in which any remaining entrained liquid droplets can effectively settle out. In like manner, the volumetric area below the liquid level increases in the direction towards the lower end of the vessel providing a low turbulence zone for oil/water separation. The sloped vessel is uniquely adapted for use of a vortex tube cluster.

BRIEF DESCRIPTION OF THE DRAWINGS

FIGS. 1, 2 and 3 are representative of prior art.

FIG. 4 is a diagrammatic representation of a horizontally oriented process vessel having a mixed phase inlet, a dry gas outlet and two liquid outlets. A vortex tube cluster and a vane-type mist eliminator are positioned within the vessel. Gas passes out of the vortex cluster passes through the mist eliminator before exiting through the dry gas outlet.

FIG. 5 is a representation of a vertical treatment vessel having a mixed phase inlet that communicates with a cluster of vortex tubes and wherein compartments within the vertical structure causes gas flowing out of the vortex tube cluster to pass through a vane-type mist eliminator before the gas flows out through the dry gas outlet.

FIG. 6 represents a treatment vessel having a vortex tube cluster substantially as FIG. 4 but in which a mesh-type mist eliminator is employed. The mesh-type mist eliminator of FIG. 6 is a pad of woven, twisted or bunched filaments forming a discontinuous surface area for entrapping entrained liquid droplets.

FIG. 7 is a diagrammatic representation of a vertically oriented treatment vessel arranged similar to that of FIG. 5 but wherein a mesh-type mist eliminator is employed to extract mist from gas before it passes out the vessel dry gas outlet.

FIG. 8 illustrates a vessel having an inlet, a dry gas outlet and two liquid outlets. The vessel is vertically arranged and employs a vortex cluster augmented by cartridge-type coalescing elements to separate liquid from a wet gas stream.

FIG. 9 illustrates a system having the combination of a vortex tube cluster followed by cartridge-type filter elements in a horizontal vessel, further followed by a vane-type or mesh-type mist eliminator.

Further objects and features of the invention will be apparent to those skilled in the art upon reference to the accompanying drawings and upon reading the following description of the preferred embodiments.

DETAILED DESCRIPTION OF THE PREFERRED EMBODIMENTS

Before explaining the present invention in detail it is to be understood that the invention is not limited in its application to the details of the construction and arrangement of the parts illustrated in the accompanying drawings. The invention is capable of other embodiments and of being practiced or carried out in a variety of ways. The phraseology and terminology employed herein are for the purpose of description and not limitation.

Figure 1:
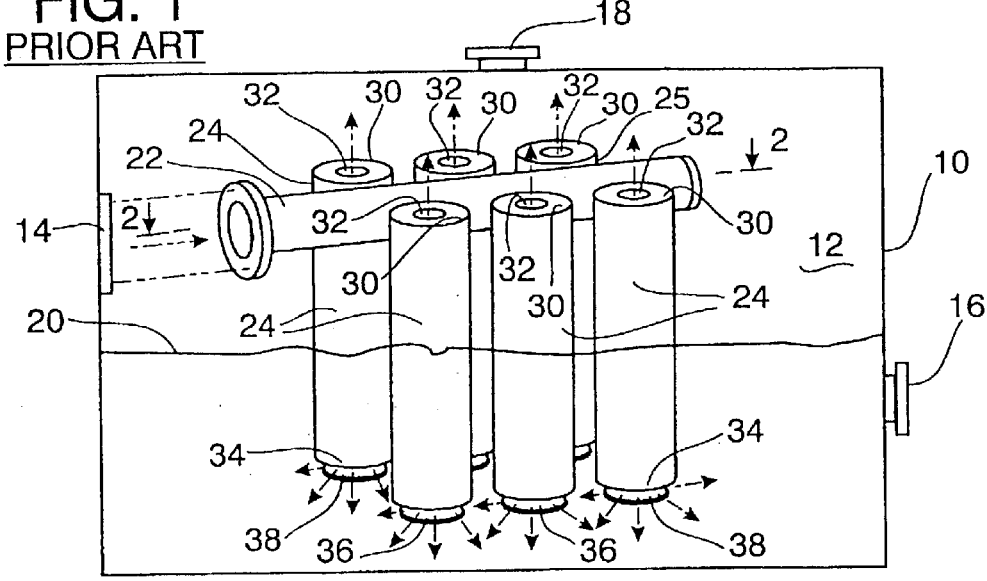
FIG. 1 is a cluster of vortex tubes positioned within a separator vessel. The vessel is shown diagrammatically to illustrate a mixed phase inlet, a dry gas outlet and a liquid outlet.

Referring to FIG. 1, a system for separating interdispersed gas and liquid phases is diagrammatically illustrated. Vessel 10 can be, as an example, a horizontal cylindrical vessel or a vertical cylindrical vessel or any other type of vessel that provides a quiescent internal zone 12. The vessel has a mixed phase inlet 14, a liquid outlet 16 and a dry gas outlet 18. In the typical operation of a separator as shown in FIG. 1, a liquid level 20 is established within a lower portion of the vessel. A liquid level control means (well known in the art and not shown) is used to control the rate of liquid discharge so as to maintain liquid level 20.

Figure 2:
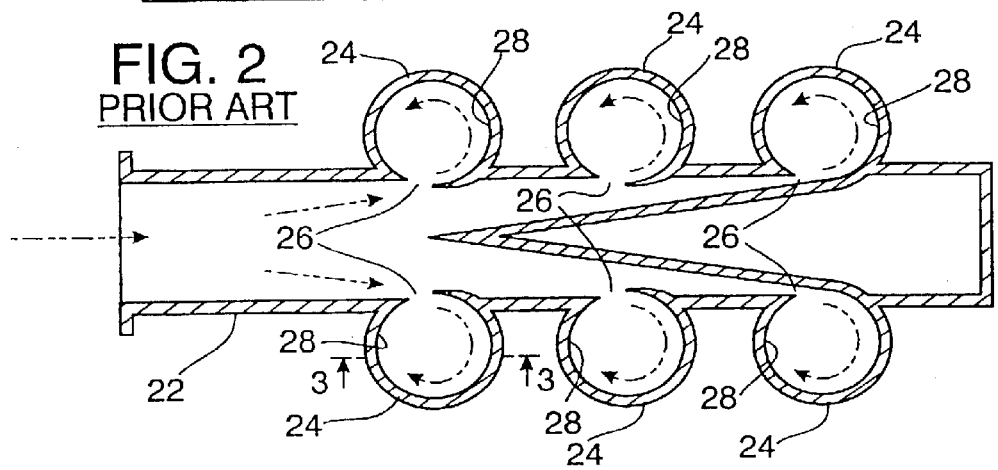
FIG. 2 is a horizontal cross sectional view taken along the line 2—2 of FIG. 1 showing the manner in which a mixed phase stream introduced from a horizontal inlet tube flows into the vertically arranged vortex tubes.

FIG. 2 is a horizontal cross-sectional view taken through an upper portion of the vortex tube cluster of FIG. 1 showing a manifold 22 that receives an inlet stream through inlet 14 of the vessel of FIG. 1, and showing a plurality of vertically positioned vortex tubes 24. Each vortex tube has an inlet 26 in the vertical sidewall thereof. Fluids under pressure flow through inlet 26 in each of the vortex tubes and enter the vortex tube tangentially—that is, as a tangent to the interior cylindrical sidewall 28 of each of the vortex tubes. A wedge 29 is positioned in manifold 22 to better distribute the inlet stream into the vortex tubes. Instead of using a wedge 24 manifold 22 may be tapered in cross-sectional area or narrowed to equalize flow from the inlet stream into the individual vortex tubes 29.

Figure 3:
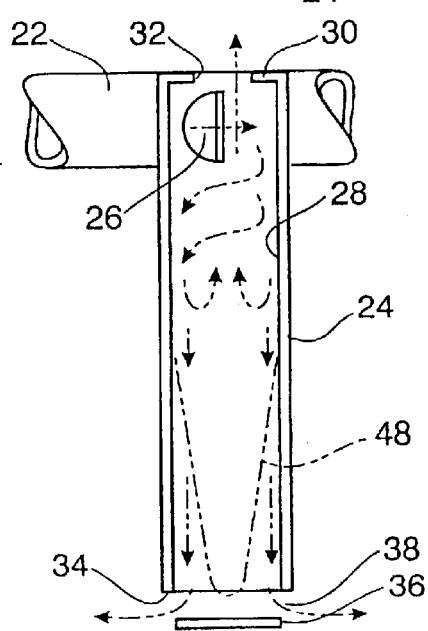
FIG. 3 is a vertical cross sectional view of one of the vortex tubes as taken along the line 3—3 of FIG. 2.

FIG. 3 is a cross-sectional view of a single vortex tube 24 that is representative of the other vortex tubes shown in the cluster. The upper end of each vortex tube is partially closed with a top plate 30 having a concentric dry gas outlet opening 32 therein. The bottom end 34 of each vortex tube 24 is open to permit the flow of liquid out of the lower bottom end. A horizontally positioned bottom diverter plate 36 is spaced from the bottom 34 of the vortex tube to allow a circumferential liquid outlet passageway 38. Bottom diverter plate 36 is typically supported to vortex tube 24 by spaced apart stand-offs that are not shown but can be in the form of short-length metal rods welded to the interior or exterior surface of the cylindrical wall of the vortex tube.

A vortex tube functions to separate immiscible liquid and gas components of a process stream by utilizing artificially created gravity—that is, centrifugal force. The process fluids enter the manifold 22 and flow through mixed phase inlet 26 into the interior of the vortex tube tangentially so that the fluids swirl at a rapid rate within the vortex tube as illustrated by the dotted lines in FIG. 3. This swirling action forces entrained liquids against each vortex tube internal cylindrical sidewall 28 where the liquid accumulates and flows downwardly by natural gravity to ultimately flow out of the vortex tube through liquid outlet passageway 38. The gas component of the process stream has substantially less density than the entrained liquid component; therefore the gas component migrates towards the radial center of each vortex tube 24 and flows out through the upper concentric dry gas outlet 32. The swirling gas takes the form of a vortex in a pattern similar to that shown by the vortex boundary 48 as seen in FIG. 3.

FIGS. 1, 2 and 3 are representative of the state of the art to which this disclosure of this invention applies. This invention provides improved ways for use of vortex tube separation, and particularly vortex tube clusters, to obtain more effective separation of an entrained immiscible liquid component from a mixed phase inlet stream. Systems disclosed herein can operate with one or more vortex tubes. Each vortex tube is typically oriented vertically but can operate as long as it has a vertical downward tangent. The use of vortex tube clusters is preferred. A separator can include a single vortex tube, a cluster of vortex tubes or a plurality of clusters of vortex tubes depending on the volume of fluids being treated.

The improvements of the invention are illustrated in FIGS. 4 though 16 as will now be described.

FIG. 4 is an elevational cross-sectional view of a horizontal separator vessel 10A that has an inlet 14, a dry gas outlet 18 and a liquid outlet 16. Positioned within the interior of vessel 10A is a vortex tube cluster generally indicated by the numeral 40 as illustrated and described with reference to FIGS. 1 and 2. A liquid level 20 is maintained within vessel 10A. While the vortex tube cluster 40 functions to extract a substantial percentage of any entrained liquids entering through inlet 14 nevertheless in the usual case the gas that emanates from the upper ends of the individual vortex tubes making up cluster 40 can have some residual entrained liquid component. To further de-mist the gas before it exits through gas outlet 18 the separator of FIG. 4 includes a vane-type mist eliminator 42. Such vane-type mist eliminators consist of closely spaced parallel vanes, bent or formed to create a torturous path for gas passing therethrough. The vanes are very closely spaced and are usually short from leading edge to trailing edge.

Vane-type mist eliminators have been used previously in industry for augmenting the separation of entrained liquids from a gas stream but have a common problem in that they can easily become flooded with liquid if too much entrained mist is carried into them by the gas stream. Flooding occurs when liquid bridges the gap between adjacent vanes over a significant portion of the vane flow area. If flooded, liquid-in-gas carryover can result. The concept as revealed in FIG. 4 is an improved way of using a vane-type mist eliminator 42 in the treatment of wet gas. The use of a vortex tube cluster 40 in advance of vane-type mist eliminator 42 results in removal of a substantial portion of entrained liquid from the wet gas stream before the wet gas stream passes through the vane-type mist eliminator, thus substantially reducing the possibility of flooding of the mist eliminator. The combination of a vortex tube cluster separation system with a vane-type mist eliminator minimizes the need for a large gravitation separation section in vessel 10A. Thus, the combination of the vortex tube cluster 40 and vane-type mist eliminator 42 can result in a significantly reduced size of vessel 10A required to treat a given gas flow stream rate to thereby reduce the overall cost of a separator.

The vane-type mist eliminator preferably closes the full interior area of vessel 10 above liquid level 20—that is, the lower edge of vane-type mist eliminator 42 extends within liquid retained in the lower portion of the vessel to ensure that all of the gas passing out from vortex tube cluster 40 passes through mist eliminator 42 before exiting the vessel through dry gas outlet 18.

If the liquid extracted from the mixed phase flowing through the vessel 10A is of two-phases—that is, if the liquid includes, as an example, both a water phase and a hydrocarbon phase (such as crude oil), the liquid outlet may be separated into two portions. As shown in FIG. 4 a partition wall 44 divides the lower portion of vessel 10A into two parts. Any hydrocarbon or lighter component of the extracted liquid will float on the surface of a denser liquid phase above an interface 45 and can flow over the upper edge 46 of partition wall 44 into a lower liquid interior section 48 of vessel 10A that has a lower liquid level 50. The lighter density (oil) phase having liquid level 50 may be withdrawn through a second liquid outlet 52. If the liquid component of the wet gas stream is of a single phase or if no separation of liquid components is required, then partition wall 44 and second liquid outlet 52 may be eliminated. In the operation of the system of FIG. 4, it would be necessary to have a liquid level control to regulate the height of liquid level 50 in the section 48 of the vessel interior and such liquid height control is not shown since it is well known and commonly practiced in the art of gas/liquid separation.

FIG. 5 is an alternate embodiment of the system of FIG. 4 that employs the combination of a vortex tube cluster and a vane-type mist eliminator. In the arrangement of FIG. 5, vessel 10B is a vertically oriented elongated cylindrical vessel that has an inlet 14, a vortex tube cluster 40, a dry gas outlet 18 and a liquid outlet 16, all functioning as described with reference to FIG. 4. In FIG. 5 the vortex tube cluster 40 is illustrated as if it has four separate vortex tubes rather than six (as in FIG. 4) but the function is the same. As previously noted, the number of vortex tubes in a cluster can vary from one to many depending upon the volume of process fluids handled by the system and the physical arrangement of the vessel.

In the arrangement of FIG. 5 a first lower partial horizontal shelf 54 and a second upper partial horizontal shelf 56 are utilized. Extending between shelves 54 and 56 is a vane-type mist eliminator 42 that is constructed like, and has the same function as, the mist eliminator in FIG. 4. The dry gas passing out the upper ends of the individual vortex tubes making up vortex cluster 40 must pass through mist eliminator 42 before exiting the vessel through dry gas outlet 18. In this way, vane-type mist eliminator 42 will extract a substantial portion of any remaining liquid carried by the gas stream. Thus the arrangement of both FIGS. 4 and 5 places in series a vortex tube cluster 40 and a vane-type mist eliminator 42 to enhance the separation of interdispersed phases in the process stream.

Additional liquid extracted from the gas stream flowing through mist eliminator 42 in FIG. 5 falls onto first horizontal shelf 54. An opening in the shelf receives the upper end of a conduit 58 by which liquid extracted by mist eliminator 42 is passed downwardly into the lower interior end portion of vessel 10B, the lower end of conduit 58 extending below liquid level 20.

Mist eliminators 42 of the type employed in the arrangement of. FIGS. 4 and 5 are, as previously indicated, well known devices used in industry for separating entrained liquids from a gas stream and are formed by a plurality of closely spaced vanes through which the gas flows. These vanes can be arranged in a variety of ways within the vessel, all well known in the art such as in a thru-flow system, a cross-flow system, a radial-flow system and so forth. Regardless of the specific arrangement of vanes in the vane-type mist separator, the essence of the invention as illustrated in FIGS. 4 and 5 is the combination of a vortex tube cluster and vane-type mist eliminator in which the gas first passes through the vortex tube cluster wherein a substantial portion of entrained liquid is removed so that flooding is less likely to occur in the vane-type mist eliminator.

FIG. 6 illustrates an embodiment of the invention wherein vessel 10A has an inlet 14, a vortex tube cluster 40, a dry gas outlet 18, a liquid outlet 16, a partition wall 44, a first liquid outlet 16 and a second liquid outlet 52 all have the same function as described with reference to FIG. 4. The only difference between the embodiment of FIGS. 4 and 6 is that instead of a vane-type mist eliminator as in FIG. 4, FIG. 6 illustrates the use of a mesh-type mist eliminator 60. Mesh-type mist eliminators use a pad of woven, twisted or bunched filaments forming a large but discontinuous surface area for entrained liquid droplets to impinge against and cling to. The filaments used in a mesh-type mist eliminator may consist of metallic wire or a composite of wire interwoven with finer filaments such as made of Nylon, Teflon® or so forth. The filaments are closely spaced and because of their random configuration, they drain themselves slowly compared to other types of mist eliminators. Therefore, mesh-type mist eliminators can easily become flooded if too much entrained liquid is carried into it by a gas stream. If flooded, liquid-in-gas carryover may result. In the embodiment of FIG. 6, the chance of flooding of mesh-type mist eliminator 60 is substantially reduced due to the provision of the vortex tube cluster 40 by which a substantial portion of liquid entrained in inlet 14 is removed before the relatively dry gas from the vortex tube cluster passes through mesh-type mist eliminator 60. As in the case of the vane-type mist eliminator of FIG. 4, the use of the mesh-type mist eliminator 60 of FIG. 6 in combination with a vortex tube cluster improves demisting performance and can result in reduced separator size in many cases—that is, the size of vessel 10A can be reduced since a large volumetric area is not required for gravity separation.

FIG. 7 bears the same relationship to FIG. 6 as FIG. 5 does to FIG. 4—that is, FIG. 7 shows a mesh-type mist eliminator 60 used in a horizontal fashion in a vertically oriented vessel in combination with vortex tube cluster 40. Whereas FIG. 7 shows the mesh-type mist eliminator horizontally mounted, which can be placed in a vertical arrangement as in FIG. 5 if desired.

FIG. 8 diagrammatically illustrates the embodiment of the invention wherein a vortex tube cluster 40 is employed in combination with a plurality of cartridge-type coalescing elements 62. Vessel 10C has a horizontal plate 64 spaced above vortex tube cluster 40, the plate dividing the interior of vessel 10C into an upper portion and a lower portion. Horizontal plate 64 has a plurality of spaced apart openings (not seen), one for each cartridge-type coalescing element 62. Each coalescing element 62 typically employs a very fine porous network that can easily be flooded with liquid if too much entrained mist is carried into it by the gas stream. If flooded, liquid-in-gas carryover may result. By preceding coalescing elements 62 with vortex tube cluster 40 the bulk of liquid carried by gas entering wet gas inlet 14 is removed before the relatively dry gas from the vortex tubes is passed upwardly into coalescing elements 62, thereby substantially reducing the possibility of these elements being flooded.

Coalescers such as the cartridge-type coalescers 62 function by providing hydrophilic fibrous material to which water droplets cling so that the droplets coalesce from fine droplet size into larger droplet size, the larger droplet size flowing downwardly and out of the coalescers, the liquid accumulating to a level 66 above horizontal plate 64. The liquid level accumulating in the upper portion of the vessel above horizontal plate 64 passes out through a secondary liquid outlet 68. A method of maintaining water levels 66 and 66A is required, as is standard procedure in designing equipment to extract entrained liquid from a gas stream.

In the arrangement of FIG. 8, the dry gas outlet 18 is shown the same as in FIGS. 5 and 7 however, an alternate location for the dry gas outlet is indicated by 18A. Normally the use of two dry gas outlets would not be required.

FIG. 9 shows a treatment vessel that employs a vortex cluster 40 in series with horizontally supported cartridge-type filter elements 70. Filter elements 70 are primarily for intercepting and removing of solid particles in a gas stream but frequently have the secondary function of coalescing liquid droplets to aid liquid separation. Elements 70 typically have a very fine porous network that can easily become saturated with liquid if excessive entrained mist is carried into them by the gas stream. If flooded, liquid-in-gas carryover may result. By preceding filter elements 70 with vortex tube cluster 40, the majority of any entrained liquid in the inlet gas stream is removed before the drier gas from the vortex tube cluster passes through filter elements 70. The combination of the vortex tube cluster 40 and filter elements 70 can prevent liquid carryover and can serve to reduce vessel size since a large area for gravitational separation is not required. The use of filter elements 70 in combination with the vortex cluster as in FIG. 9a can be achieved using either a horizontal vessel as illustrated or a vertical vessel.

In the embodiment of FIG. 9, a vertical wall 72 divides the interior of vessel 10D into two portions. The vertical wall has openings therein (not seen) each of which is in communication with the interior of a filter element 70 so that gas passing from the first section 74 of the interior of vessel 10D into the second section 76 passes through filter elements 70.

A short height wall 78 provides an area to receive and maintain liquid to a level 80 that covers the lower ends of the vortex tubes in cluster 40, the liquid level 80 functioning as described for water level 20 in FIG. 1. Excess liquid flows over the top of a short height wall 78 and into a catch system 82 by which the liquid is drained away through outlet 84. A similar liquid catch system 86 communicates with the second internal section 76 of vessel 10D by which liquid is discharged through outlet 88.

FIG. 9 shows optionally a mesh-type or vane-type mist eliminator 60 so that any mist carryover that is not captured by vortex tube cluster 40 or filter elements 70 can be intercepted and extracted from the gas stream before the dry gas exits through dry gas outlet 18.

Figure 10:
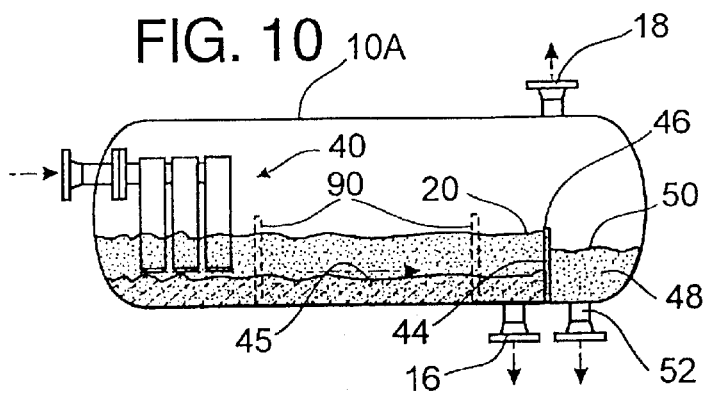
FIG. 10 shows a treatment vessel having a vortex tube cluster that receives the inlet flow of a mixed phase stream. Perforated plate baffles are positioned transversely in the vessel liquid section. The plate baffles serve to improve flow distribution in the quiescent zone of the vessel to augment separation of two different liquid phases.

FIG. 10 diagrammatically illustrates the concept of providing a series relationship between vortex tubes (represented by vortex tube cluster 40) and perforated plate baffles in the liquid section. A pair of spaced apart perforated plate baffles 90 cover the bottom portion of the interior of vessel 10A so that liquid extracted from an inlet stream by the vortex tube cluster 40 must flow through baffles 90 before flowing out of the vessel through liquid outlet 16. Perforated plate baffles are sometimes installed to improve liquid phase distribution in a quiescent zone of a separator. By use of perforated baffles 90 gravity separation efficiency is improved. The combination of a vortex tube cluster 40 with perforated plates 90 creates a two step oil/water separation process whereby the high gravity field inside vortex tube cluster 40 induces bulk separation and the perforated plates coerce coalescence of water droplets dispersed in oil and oil droplets dispersed in water. Perforated baffles 90 then utilize retention volume more efficiently and maximize true retention time of the liquid phases. This sequence optimizes oil/water separation performance and allows a reduction in the separator vessel size.

The vessel of FIG. 10 is arranged like the vessel of FIGS. 4 and 6 for two-phase liquid separations wherein a partition wall 44 having an upper edge 46 allows a hydrocarbon component to flow on a water level and to pass over edge 46 and into section 48 of the interior of the vessel where a second liquid level 50 is maintained. The accumulated liquid hydrocarbon component is passed out through second liquid outlet 52.

Figure 11:
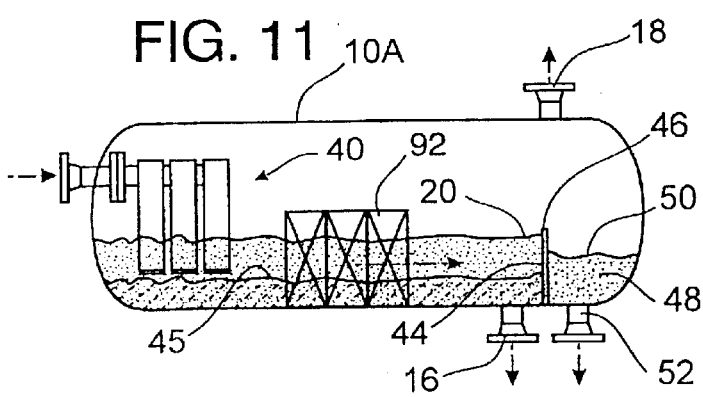
FIG. 11 shows the combination of a vortex tube cluster in a treatment vessel followed by one or more sections of packed coalescing elements in the liquid stream.

FIG. 11 shows the combination of vortex tube separation and one or more sections of packed coalescing elements in the liquids section, the packed coalescing elements being indicated by the numeral 92. Packed coalescing elements 92 are of either the structured packing-type or the clump-packing-type. The structured packing-type usually has a pre-formed rigid structure characterized by a path for liquid flow in the primary flow direction. Such structure packed coalescing elements are commercially available under the trademark "PERFORMAX®". These elements can be oriented in a number of ways.

"Dump-packing" refers to loose aggregate packing such as of Pall rings or ceramic saddles that are poured into the coalescing chamber. These elements aid gravity settlement efficiency by helping distribute flow, by reducing turbulence, by introducing impingement surfaces, by reducing the required rise/fall distances of the dispersed phases and by creating inertial separation forces. The combination of vortex tube cluster 40 and coalescing elements 92 whether of the structured packing-type or the dump-packing-type creates a two step oil/water separation process whereby the high velocity gravity fields inside the vortex tubes 40 induce bulk separation and coerces coalescence of water droplets dispersed in oil and of oil droplets dispersed in water. Then the coalescing elements 92 provide low turbulence conducive to separation. This optimizes oil/water separation performance and achieves a reduction in the separator vessel size. In the embodiment of FIG. 11 the dry gas passing out of vortex tube cluster 40 flows the length of vessel 10A to exit through gas outlet 18. If required, vane-type mist extractors or mesh-type mist extractors could be interposed in the pathway of the gas flowing from the vortex tube cluster to exit 18.

Figure 12:
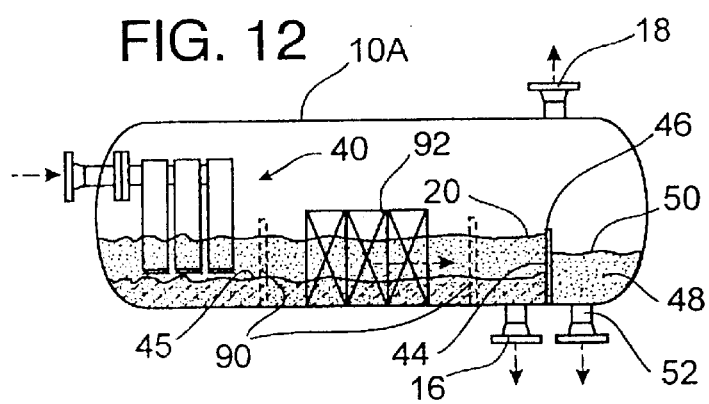
FIG. 12 illustrates a treatment vessel similar to that of FIGS. 10 and 11 but shows the combination of a vortex tube cluster, packed coalescing elements and perforated plate baffles.

FIG. 12 is an embodiment of the invention as illustrated in FIG. 11 with the addition of two perforated plate distributor baffles as has been described with reference to FIG. 10. Thus in FIG. 12, liquid having been extracted by vortex tube cluster 40 Plows through a first perforated plate 90 and then through coalescing elements 92 which may either be of the structured packing-type or the dump-packing-type as has been described with reference to FIG. 11. The liquid then further flows through a second perforated plate 90 before the liquid passes out through water outlet 16. A lighter density or hydrocarbon phase of the liquid (if it exists) passes out through second liquid outlet 52. Therefore, in FIG. 12, four separation components are used in series—that is: (1) a vortex tube cluster 40 wherein liquids are extracted from a mixed phase inlet stream; (2) a first perforated plate distributor baffle 90; (3) one or more coalescing elements 92; and (4) a second perforated plate distributor baffle 90.

Figure 13:
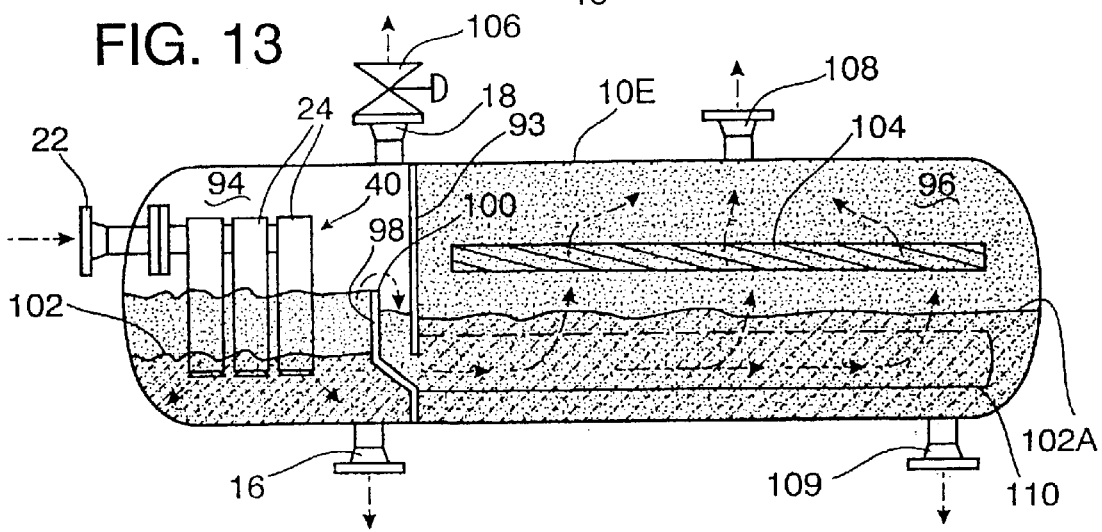
FIG. 13 shows a treatment vessel that employs the combination of a vortex tube cluster with an electrostatic field coalescer employed to remove small highly dispersed or emulsified water droplets from oil.

FIG. 13 is a diagrammatic representation of a separator system that combines the advantages of a vortex tube cluster 40 with electrostatic separation achieved by an electric field.

FIG. 13 shows a vessel 10E having a vertical wall 93 dividing the vessel into a liquid extraction compartment 94 and a hydrocarbon/water separation section 96. An upwardly extending partition wall .98 having an upper edge 100 augments wall 93. By means of interface detectors and level controls (that are not shown in the drawing but are well known to practitioners of gas/water/hydrocarbon separation) a hydrocarbon/water interface level 102 is maintained in section 94 and in like manner a hydrocarbon/water interface 102A is maintained in section 96. Water in the lower portion of section 94 is drawn off through water outlet 16. The hydrocarbon phase flows over the upper edge 100 of partition wall 98 and passes into the vessel hydrocarbon/water separation section 96 through a spreader 110. In section 96, oil with any entrained water is subject to an electric field diagrammatically illustrated by 104 to thereby augment coalescence and separation of water droplets from the oil. Gas that is extracted from the incoming fluid stream by the vortex tubes flows out the upper ends of the tubes 24 into the upper portion of vessel compartment 94. Gas is withdrawn through gas outlet 18. However, a back pressure valve 106 on gas outlet 18 maintaining pressure within the vessel sufficient to cause oil separated within section 96 to flow out of vessel 10E through an upper oil outlet 108 while water flows out of section 96 through water outlet 109.

Electric field 104 may be oriented in various configurations within vessel 10E and may provide an AC, a DC or a Dual Polarity® field. Flow through electric field 104 can be vertical or horizontal. Electric oil fields generate attractive forces between dispersed water-in-oil droplets to speed up droplet coalescence. This process requires a relatively low water fraction entering the field. Typically, electric field coalescence is intolerant of gas disturbance. In the system as shown in FIG. 13 the use of vortex tube cluster 40 allows the degassing functions to be performed in a smaller liquid extraction section 94 of vessel 10E thus aiding overall performance and reducing vessel size. The combination of vortex tube separation achieved by vortex tube cluster 40 combined with electric field 104 causes the separate liquid phases to coalesce more quickly thus promoting faster bulk water removal.

A typical system for coalescing heavier and lighter components for an emulsion is illustrated in U.S. Pat. No. 4,400,253 entitled, "Voltage Control System for Electrostatic Oil Treater", the patent having issued on Aug. 23, 1983. The electric fields through which emulsions are subjected to augment coalescence in this disclosure are varied from DC fields to alternating current fields. U.S. Pat. No. 4,417,971 entitled, "Circuit for Maintaining the Strength of an Electrostatic Field Generated in a Fluid Mixture of Varying Dielectric Strength" that issued on Nov. 29, 1983 teaches a system in which a DC field is established between spaced apart electrodes through which an emulsion passes.

The physical arrangement of systems for subjecting an emulsion to an electric field can vary considerably. As previously mentioned, a typical vessel is a horizontal cylindrical vessel having therein parallel spaced apart plates of conductive metal with a lighter component or oil outlet above the plates and a water outlet below the plates and with an emulsion inlet arranged so that at least a substantial portion of the emulsion passes between the plates. Another system for treating emulsions includes the use of an upright cylindrical vessel having a tubular electrode and a central electrode extending axially within the tubular electrode, the emulsion passing upwardly through the field established between the tubular electrode and the central electrode. This system is illustrated in U.S. Pat. No. 5,575,896 entitled, "Method and Apparatus for Oil/Water Separation Using a Dual Electrode Centrifugal Coalescer". For an example of a system that uses a plurality of electrodes, in the form of flat plates, resulting in a plurality of electric fields through which emulsion passes, reference can be had to U.S. Pat. No. 4,804,453 entitled, "Resolution of Emulsions for Multiple Electric Fields". This system and method of this invention can be practiced by employing a vortex tube cluster followed by an electric field such as these taught in these United States patent mounted in a common treatment vessel.

The system of FIG. 13 may include the use of other components as illustrated herein such as the use of vane-type mist eliminators, mesh-type mist eliminators, coalescing elements, filter elements or perforated plates arranged in various combinations as suggested by the illustrations of FIGS. 4–12.

It can be seen that FIGS. 4 through 13 illustrate a number of different combinations of separation system components that exploit the advantages of a vortex tube cluster for extracting a substantial majority of liquid entrained in a mixed phase stream. In each example, a vortex tube cluster is followed by subsequent treatment elements and systems that further reduce the dryness of the gas passing out of the system or that aid in the separation of heavier and lighter components of the liquid extracted from a mixed phase inlet stream. The systems herein take advantage of the high efficiency per unit volume required for vortex tube clusters to remove entrained liquids from mixed phase streams to thereby reduce overall vessel sizes of separator systems.

Referring now to FIGS. 14 through 17 an alternate embodiment of the invention is illustrated that is characterized by the provision of a system including an elongated sloped vessel 112. Vessel 112 is similar to vessels shown in FIGS. 4, 6, 9 and 10 through 13 with one major and important difference. As seen in the elevational view of FIG. 14, vessel 112 has a first end 114 and a second end 116 and the vessel is sloped—that is, its longitudinal axis is at an angle with respect to the earth's surface 118 so that the vessel second end 116 is at a higher elevation than vessel first end 114.

Figure 14:
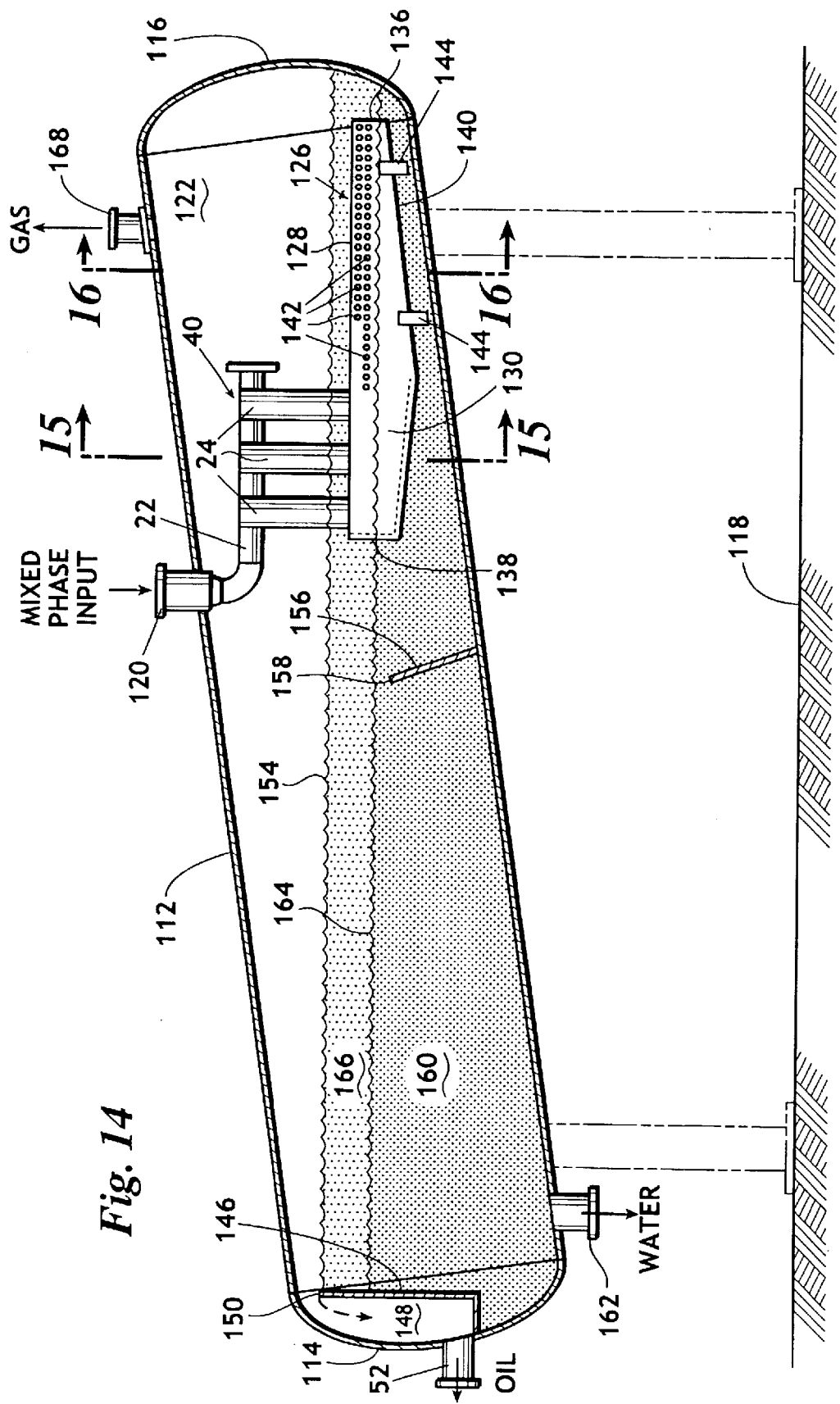
FIG. 14 is an elevated cross-sectional view of an elongated sloped vessel that uniquely takes advantage of the efficiency and effectiveness of a vortex tube cluster as an inlet device. The sloped vessel of FIG. 14 provides a system in which the volumetric area of the vessel above a liquid level in which gas accumulates increases in the direction towards the gas outlet near the elevated end of the vessel to thereby result in a decreased velocity flow with correspondingly greater quiescence of the gas and providing an ideal environment in which any entrained liquid droplets can fall out within the vessel before the gas exits the vessel. In like manner, the volumetric area below the liquid level increases in the direction towards the lower end of the vessel providing a low turbulence zone for enhanced oil/water separation.
Figure 16:
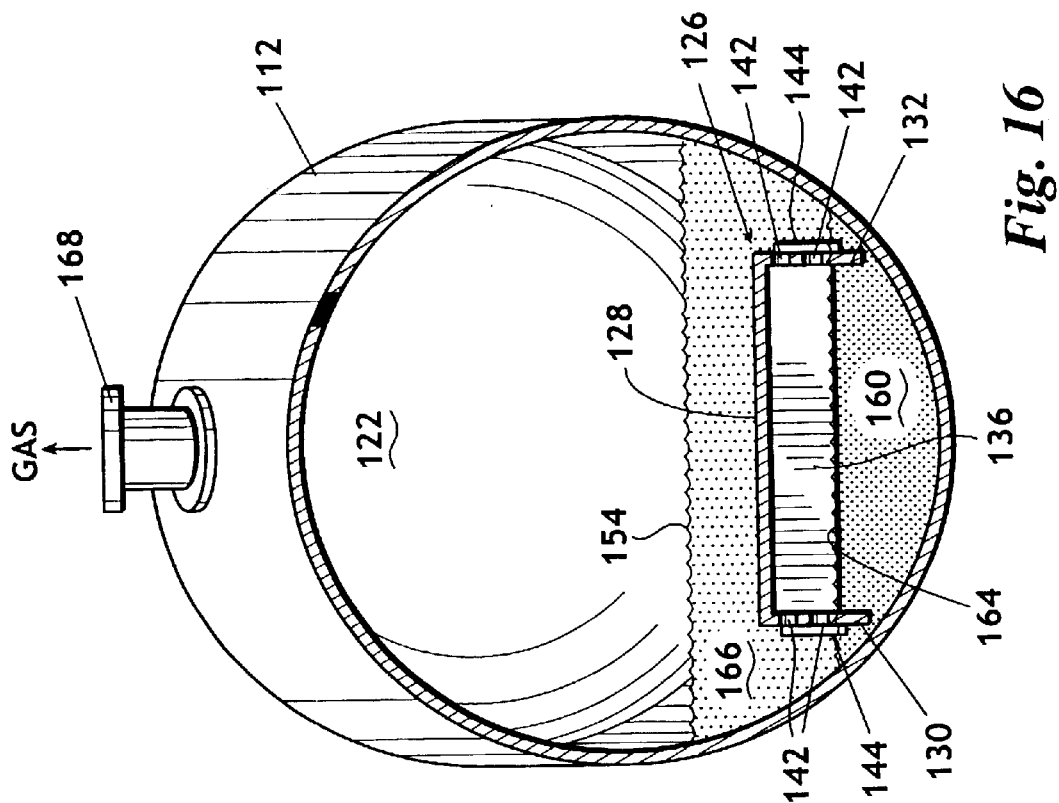
FIG. 16 is a vertical cross-sectional view taken along the line 16—16 of FIG. 14 and shows another interior view of the vessel and particularly shows the arrangement of the distribution trough as employed to introduce the inlet flow of extracted liquid taken from the vortex tubes in a manner to reduce turbulence and thereby promote better separation.
Figure 15:
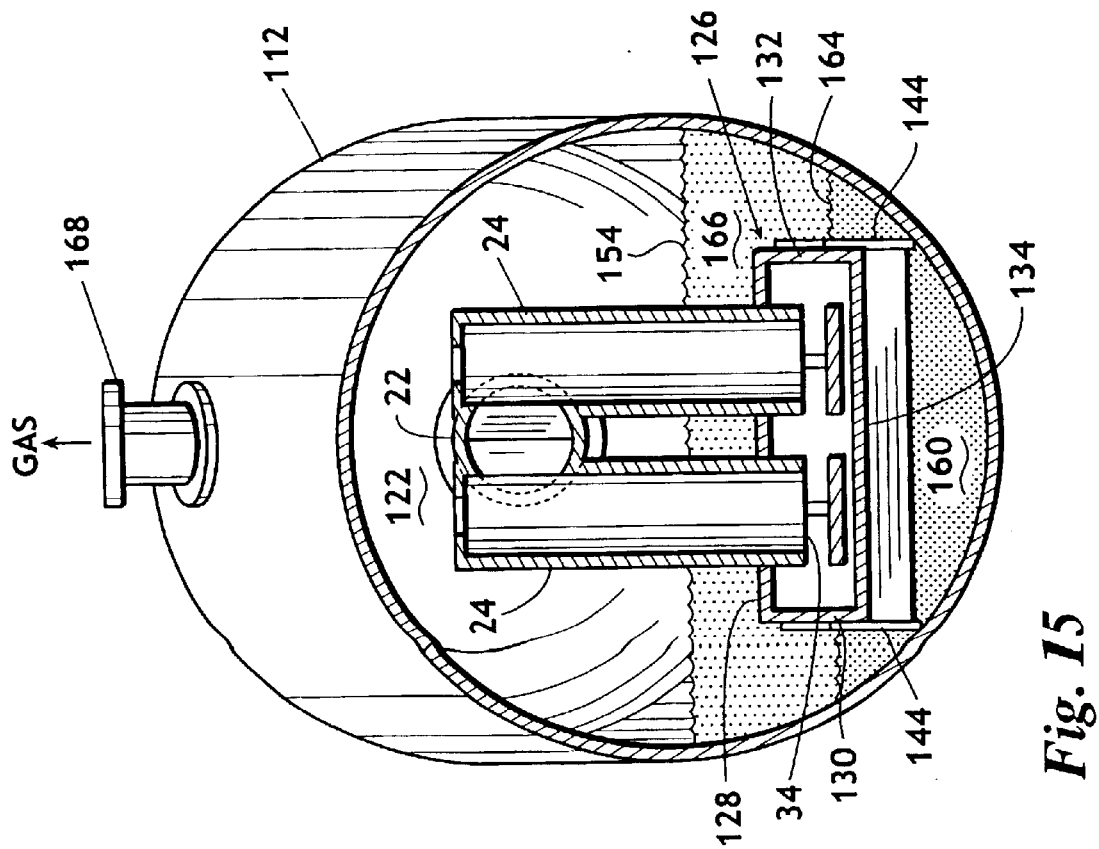
FIG. 15 is a vertical cross-sectional view taken along the line 15—15 of FIG. 14 showing the basic arrangement of the way the vortex tube cluster is positioned within the vessel and showing the lower ends of each of the vortex tubes extending within a distribution trough.
Figure 17:
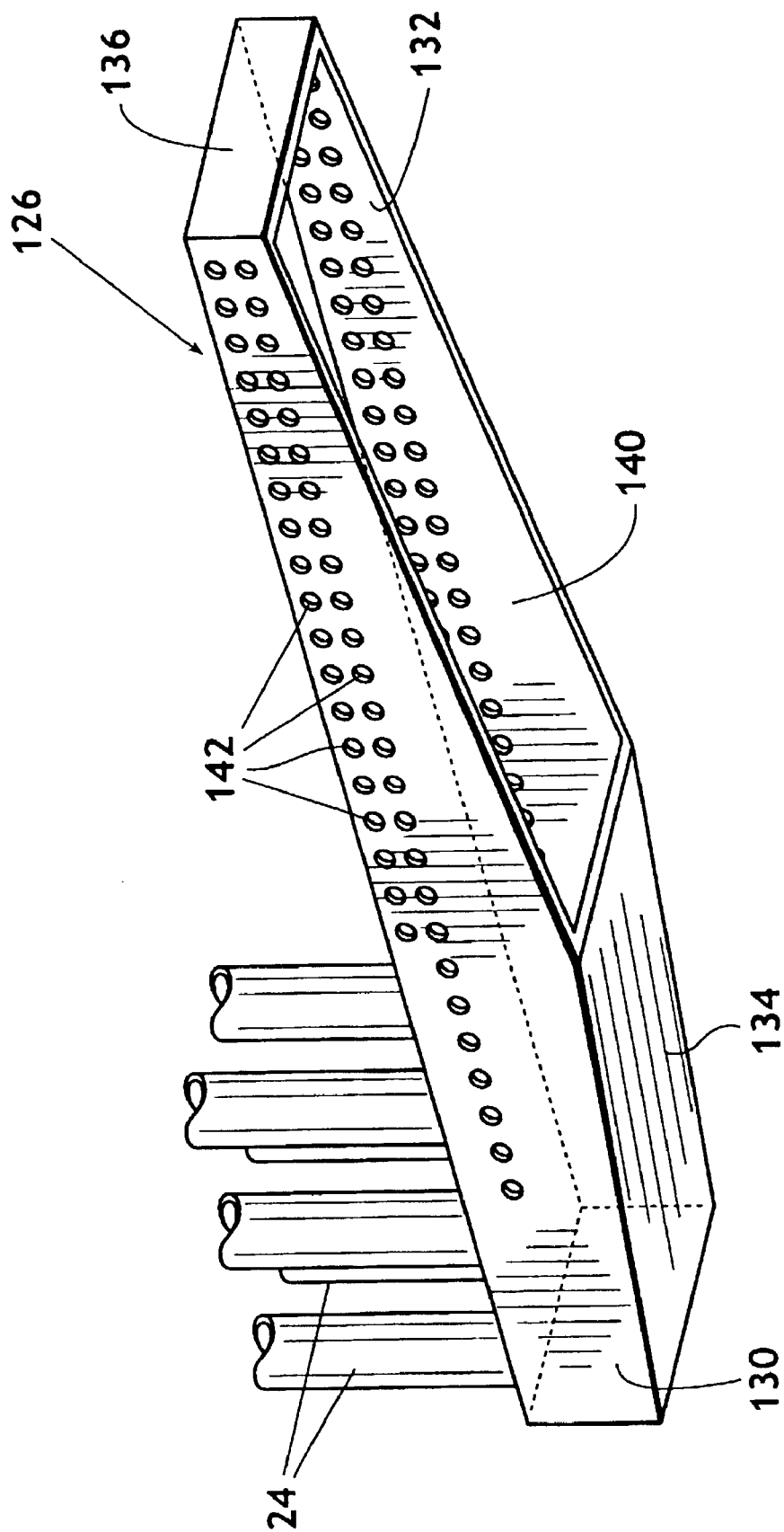
FIG. 17 is an isometric view taken from a position showing the bottom of the distribution trough and shows the vortex tubes broken away.

Vessel 112 has a mixed phase inlet 120 that can be of any stream in any industrial application that has entrained liquid components but is typical of natural gas produced from a subterranean formation as is common in the petroleum industry or crude oil from producing wells that commonly have entrained gas and water. The mixed phase stream flows through inlet 120 into an injection conduit 22 that is a part of a vortex tube cluster 40. While the number of vortex tubes in cluster 40 may vary the number illustrated is the same as in FIGS. 1 through 3—that is, where six vortex tubes 24 are employed. As illustrated and described with reference to FIG. 2, the mixed phase stream entering into injection conduit 22 is diverted through inlets 26 into each of the vortex tubes 24. Thus all of the fluids entering vessel inlet 120 flow into vortex tubes 24 where the fluid circulates circumferentially. Centrifugal force causes entrained liquid to migrate to the interior walls of the vortex tubes where the liquid accumulates and passes downwardly within the vortex tubes as illustrated in FIG. 3 and out the lower ends 34 thereof. Gas, having substantially all of the entrained liquid expelled from it, passes out the upper dry gas outlet opening 32 as seen in FIGS. 1 and 3. This dry gas passes into the upper interior gas-collecting portion 122 of the interior of vessel 112 as seen in FIG. 14.

Positioned within the vessel and below vortex tubes 24 is a distribution trough 126. The liquid that passes out the lower ends of the vortex tubes 24 enters distribution trough 126 that is illustrated isometrically in FIG. 17 and is seen in cross-section in FIG. 15.

Distribution trough 126 is elongated having a top surface 128 and sidewalls 130 and 132. A bottom plate 134 covers the portion of the bottom of the distribution trough immediately surrounding the lower ends of the vortex tubes. The sidewalls 130 and 132 have sloped forward portions so that the height of the sidewalls are less toward the trough front end 136 compared to the rear end 138. The forward bottom of trough 126 is open at 140.

The sidewalls 130 and 132 have openings 142 therein through which inlet fluid (having been extracted from the mixed phase stream) flows into the interior of the vessel. Brackets 144 are illustrated as a means of supporting distribution trough 126 within the vessel.

The function of distribution trough 126 is to introduce extracted liquid from the mixed phase stream into the interior of the vessel in a way to minimize turbulence and thereby to provide as much as possible quiescence in the liquid within the vessel to create an environment in which different immiscible components of the liquid phases, such as oil and water, may separate.

Within vessel 112 is a partition 146 that is adjacent to first end 114. An area 148 within the vessel between partition 146 and first end wall 114 receives the light component (oil) extracted from the mixed phase inlet stream. The partition 146 has an upper edge 150 that provides a weir over which light liquid (oil) flows as it accumulates within the vessel and is withdrawn through oil outlet 52.

Weir 150 establishes a liquid level 154 that extends above the bottom ends 34 of vortex tubes 24 and further, extends above the top surface 128 of distribution trough 126.

There is also provided within the interior of vessel 112 a baffle wall 156 having an upper edge 158 over which heavy liquid (water) flows as it migrates from distribution trough 126 towards the lower end of the vessel, the water being withdrawn through a water outlet 162. Thus baffle 156 diverts the water upward toward an oil-water interface 164. This aids the disengagement of entrained small oil droplets. However in the right hand portion of the vessel—that is, where the liquid ejected from the wet gas stream by vortex 24 passes out of distribution trough 126, the liquid is essentially a dispersion, the dispersion separating by the effect of gravity so that as the liquid migrates toward the left end of the vessel where both liquid outlets 152 and 162 exist the liquid thereby separates into the heavier and lighter—that is, oil and water components as illustrated.

The system for separating entrained liquid and gas phases using a sloped vessel of FIGS. 14 through 17 is primarily designed to extract entrained liquids from an essentially gas inlet stream, or extract entrained gas from an essentially liquid inlet stream so that, in either way, a gas-free liquid results. The gas collecting portion 122 within the interior of vessel 112 is all of the interior portion above liquid level 154 as established by weir 150. It is noted that this cross-sectional area of the gas-collecting portion 122 increases in the direction towards the upper end 116 of vessel 112. A gas outlet 168 removes dry gas from the vessel. The sloped vessel 112 has a unique characteristic as applied to the separation of entrained liquids from a gas stream in that it provides an environment in which the dry gas, having substantially all of the liquid extracted therefrom as the gas passes through the vortex tube cluster 40, migrates in a direction toward the gas outlet 168 in a way that the velocity of flow of the gas gradually decreases due to the increased cross-sectional area of the gas collecting portion 122. This decreased flow velocity results in continually decreased turbulence so that any entrained droplets of liquid remaining within the gas stream that pass out the upper ends of the vortex tubes have an opportunity to fall out of the gas stream and back into the liquid in the lower portion of the vessel. As gas passes in the direction towards outlet 168 it is continually exposed to decreased turbulence providing a significantly improved system for effectively and efficiently extracting entrained liquids from a gas stream or extracting gas from an essentially liquid stream.

The sloped vessel (as illustrated in FIGS. 14 through 17) is adaptable for use in combination with an inlet system that includes at least one vortex tube 24 and particularly an inlet system that includes a vortex cluster 40.

Baffle 156 is not a fluid flow barrier but a flow diverter. In fact, it is not necessary that baffle 156 be sealed to the curvature of the interior wall of vessel 112. A gap between the periphery of the baffle and the interior of the vessel is acceptable since the function of baffle 156 is not to block fluid migration from the upper end towards the lower end of vessel 112 but only to divert, or provide an upward tangent to the direction of fluid flow to augment the separation of oil and water. Baffle, or flow diverter, 156 forces liquid upwardly towards oil interface 164 so that oil droplets join the oil above the interface while water, including water droplets, curls back down into the water phase 160. Stated another way, the upward deflection achieved by sloped baffle 156 helps disengage oil and water droplets from the liquid emulsion.

The combination of a vortex tube cluster 40 in a sloped separator vessel produces synergistic results. The sloped vessel provides a dynamic arrangement for handling dry gas from the upper ends of vortex tubes and of liquids from the lower ends. Further, the use of a unique distribution trough for introducing extracted liquids into the vessel in combination with the advantage attained by use of a vortex tube cluster with the unique geometrical advantages of a sloped vessel achieves significantly improved results compared with other known systems for extracting entrained liquids from a gas stream.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure It is understood that the invention is not limited to the embodiments set forth herein for purposes of exemplification, but is to be limited only by the scope of the attached claims, including the full range of equivalency to which each element thereof is entitled.

What is claimed is:

1. A system for separating immiscible water, oil and gas components of a mixed phase stream comprising:

an elongated sloped vessel having a first end and an opposed second end in which the second end is higher in elevation than the first end, the vessel having a water outlet and an oil outlet adjacent said vessel first end, a mixed phase stream inlet and a gas outlet adjacent said vessel second end;

at least one vortex tube positioned within said vessel, each vortex tube having an upper gas outlet, a lower liquid outlet and a tangential stream inlet in communication with said vessel mixed phase stream inlet wherein within each vortex tube, centrifugal action separates the stream into gas and liquid components;

a partition wall within said vessel and adjacent said first end thereof having an upper edge that forms a weir over which the oil component flows into an oil outlet compartment in communication with said oil outlet, the weir forming a liquid level within said vessel and an oil/water interface being formed below the liquid level; and a sloped diverter baffle within said vessel spaced between said partition wall and said vessel second end over which liquid flows as it moves towards said water and oil outlets, an upper edge of the diverter baffle being lower in elevation than said oil/water interface.

2. A system for separating gas, water and oil components from a mixed phase inlet stream comprising:

an elongated sloped vessel having a first end and an opposed second end and in which the second end is higher in elevation than the first end and having an oil component outlet, a water component outlet, a gas outlet and a mixed phase inlet opening;

a partition wall within said vessel adjacent said first end and having an upper edge that forms a weir over which oil component flows into an oil outlet compartment in communication with said oil outlet, an upper edge of the wall forming a liquid level within the vessel, an interface being formed below the liquid level having a layer of oil below a water level;

a sloped diverter baffle within said vessel spaced between said partition wall and said vessel second end and having an upper edge over which liquid flows as it moves toward said water and oil outlet, the upper edge of the diverter baffle being lower in elevation than said oil/water interface, oil droplets being directed by the diverter baffle towards said oil layer above said water level; and at least one vortex tube positioned within said vessel having an upper gas outlet, a lower liquid outlet and a tangential inlet in communication with said vessel mixed phase inlet opening.

3. A system according to claim 2 wherein said at least one vortex tube is vertically positioned with said liquid outlet thereon positioned below said liquid level within said vessel.

4. A system according to claim 2 wherein said at least one vortex tube includes a plurality of vortex tubes operated in parallel.

5. A system according to claim 2 including a distribution trough within said vessel having a top having an opening therein for each said vortex tube, said lower liquid outlet of each vortex tube communicating with an interior area of the distribution trough and openings provided in the distribution through which a liquid discharged from said at least one vortex tube passes.

6. A system according to claim 2 in which said vessel has a gas outlet therein and in which said liquid level within said vessel is a gas/liquid interface providing a gas collection area above the gas/liquid interface having communication with said gas outlet.

7. A system according to claim 2 wherein said inlet stream has a liquid component in the form of a heavier water component, lighter oil component and in which essentially dry gas passes out of said at least one vortex tube upper outlet and liquid, including said heavier and lighter liquid components, passes out of said vortex tube lower outlet.

8. A system according to claim 2 in which said inlet stream is essentially gas having a liquid component entrained therein, and in which the liquid component is an emulsion of a lighter oil component and a heavier water component.

9. A system for separating liquid from an inlet mixed phase stream comprising:

an elongated vessel having a first end and an opposed second end and in which the second end is higher in elevation than the first end, and having a liquid outlet adjacent said first, a gas outlet adjacent said second end and an inlet opening;

a wall within said vessel intermediate said end, and having an upper edge providing a weir over which liquid flows into an outlet compartment having communication with said liquid outlet, the weir forming a liquid level within said vessel;

at least one vortex tube positioned within said vessel having an upper gas outlet, a lower liquid outlet that is below said vessel liquid level and a tangential inlet in communication with said vessel inlet opening, the vortex tube being configured to cause gas to swirl therein to separate entrained liquid by centrifugal force, the liquid passing out through the vortex tubes lower liquid outlet; and a distribution trough positioned within said vessel having a top with an opening therein receiving each said vortex tube whereby said lower liquid outlet communicates with an interior area of the distribution trough and openings provided in the distribution trough through which liquid discharged from said at least one vortex tube passes into the vessel interior.

10. A system according to claim 9 wherein said liquid has an oil component and a water component, the system including a second wall within said vessel has a second wall spaced from said first mentioned wall and having a second upper edge providing a second weir that is of lower elevation than said first weir, the second wall serving to divert the water component upward toward the oil-water interface and said vessel having a water outlet opening in communication with said water phase compartment, said first mentioned liquid outlet being an oil outlet.

11. A system for separating a mixed phase stream comprising:

an elongated sloped vessel having a vortex tube cluster therein through which the mixed phase stream is introduced and by which liquid and gas phases are separated;

a gas outlet adjacent an upper end of said sloped vessel;

a liquid outlet adjacent a lower end of said sloped vessel; and a weir within said vessel establishing a liquid level above which gas accumulates, the cross-section area within said vessel above said liquid level increasing in the direction towards said gas outlet.

12. A system for separating a mixed phase stream according to claim 11 wherein the cross-sectional area within said vessel below said liquid level increasing in the direction towards said liquid outlet.

* * * * *